Nov. 17, 1936.  F. A. PARKHURST  2,061,042
MACHINE FOR EXTRUDING PLASTIC MATERIALS
Filed Oct. 16, 1934
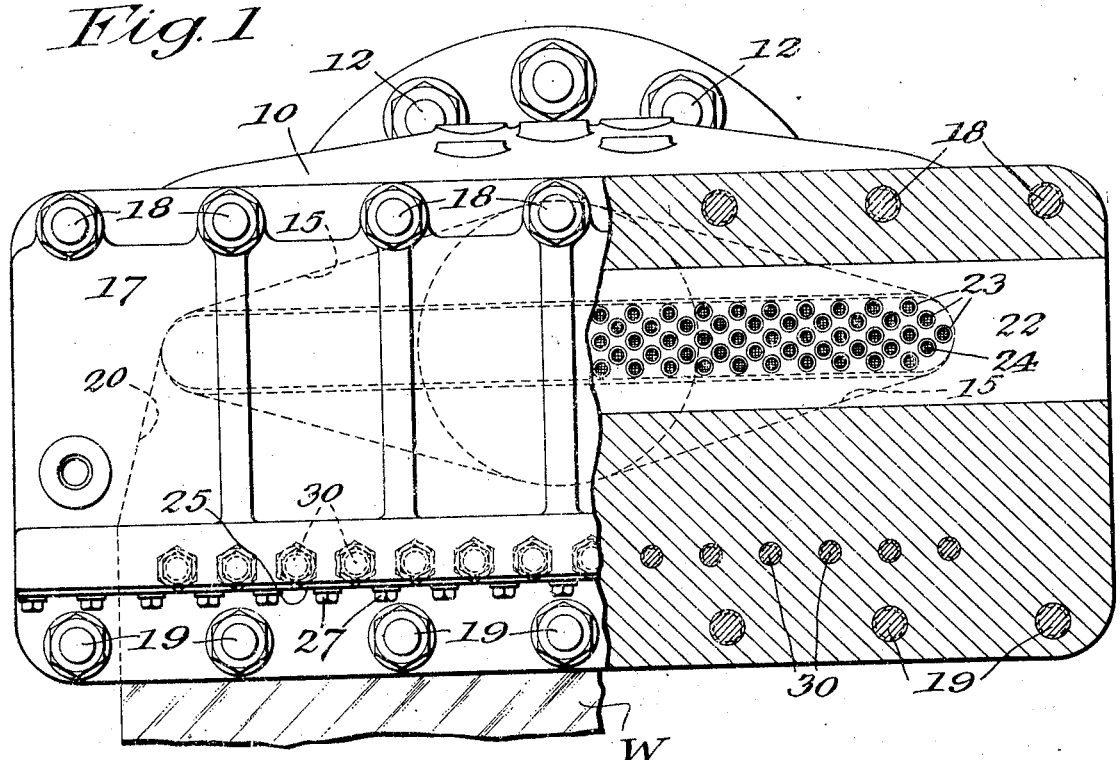
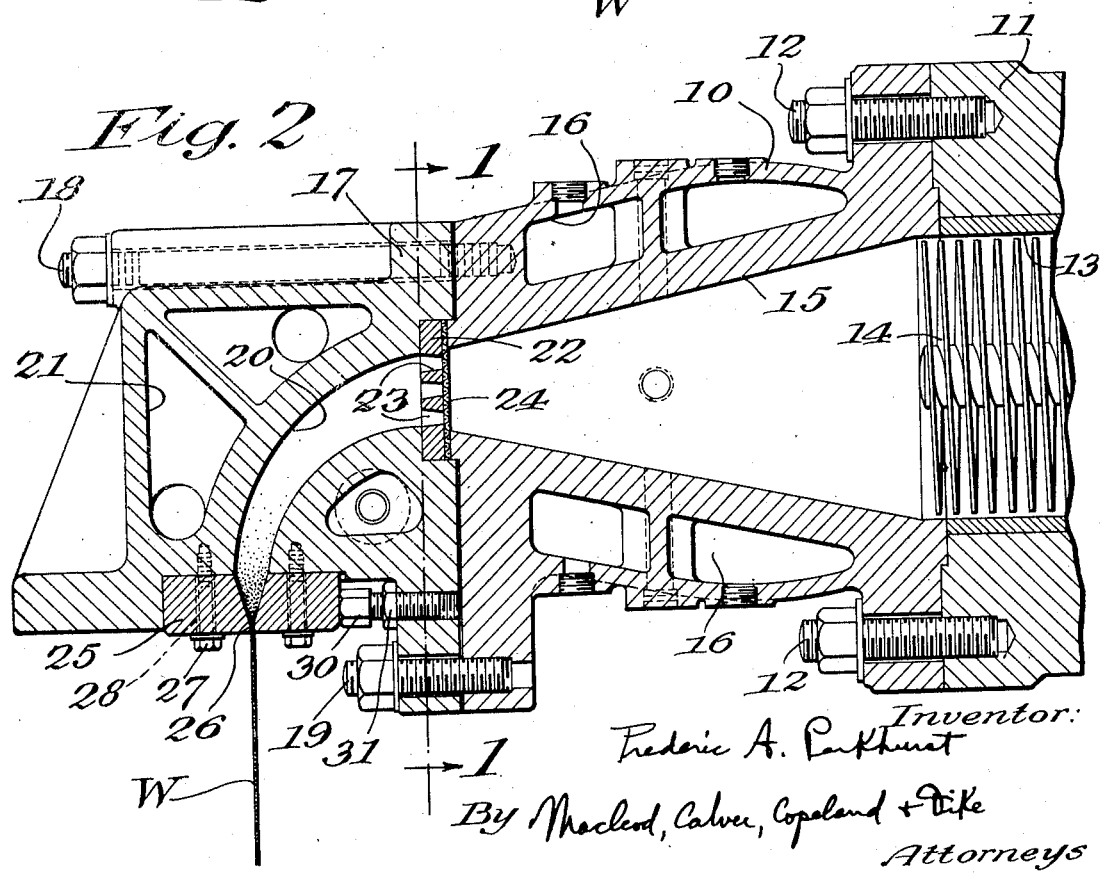
Inventor:
Frederic A. Parkhurst
By Macleod, Calver, Copeland & Dike
Attorneys Patented Nov. 17, 1936

2,061,042

UNITED STATES PATENT OFFICE 2,061,042

MACHINE FOR EXTRUDING PLASTIC MATERIALS

Frederic A. Parkhurst, Bethesda, Md., assignor to The Fiberloid Corporation, Indian Orchard, Mass., a corporation of Massachusetts Application October 16, 1934, Serial No. 748,459

3 Claims. (Cl. 18—12)

This invention relates to apparatus for forming a web or sheet by extruding plastic material, such as a cellulose ester, under heavy pressure through a slot orifice having a length and width corresponding substantially to the desired width and thickness of the sheet to be formed.

Heretofore, the commercially successful apparatus for the extrusion of plastic material under heavy pressure to form a web or sheet has been one having a circular orifice adapted to extrude the plastic material in the form of a tube which had to be slit subsequently to form a web or sheet. Attempts to form a web or sheet, heretofore, by extrusion through a straight slot die have failed because of lack of uniformity in thickness of the sheet formed, particularly transversely of the sheet.

It is an object of the present invention to provide an apparatus having a straight or slot orifice which is so constructed as to overcome the above mentioned difficulties.

The invention will be more clearly understood from the following description in conjunction with the accompanying drawing in which.

Fig. 1 is an end elevational view, partly in section taken upon the line 1—1 of Fig. 2, of an apparatus embodying the invention; and Fig. 2 is a longitudinal sectional elevational view of the apparatus.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

An apparatus embodying the invention, as illustrated in the accompanying drawing, comprises a casing 10 which is suitably secured to the end of a source of supply shown herein as an extrusion press 11 by bolts 12. The extrusion press 11 is of the usual construction and is provided with a substantially cylindrical passage 13 in which a feed screw 14 is rotatably movable for feeding the plastic stock through the press. The casing 10 is provided with a passage 15 which communicates with the passage 13 of the extrusion press and is surrounded by ducts or passages 16 in which a temperature controlling fluid, such as water, is circulated. A casing 17 is suitably secured to the other end of the casing 10 by bolts 18 and 19 and is provided with a passage 20 having an inlet end of elongated shape registering with the adjacent elongated passage 15 and surrounded by ducts or passages 21 in which a temperature controlling fluid is circulated. The end of the casing 17 adjacent the casing 10 is provided with a recess to receive and hold an obstruction, such as a partition or bridge 22 having a plurality of apertures 23, adapted to extend across the passages 15 and 20 at their point of communication. If desired, a screen 24 may also be interposed between the bridge 22 and the casing 10. A plate or die lip 25 having a slot orifice 26 adapted to register with the passage 20 is secured upon the casing 17 by a plurality of bolts 27 passing through enlarged openings 28 in the plate 25. A plurality of adjusting screws 30 are mounted in the casing 17 so as to engage and adjustably position the plate or die lip 25. Each of the screws 30 is provided with a lock nut 31 for locking it in its adjusted position. Thus, it will be noted that the passages 15 and 20 provide a continuous passage between the extrusion press and the orifice 26, the width and depth of which gradually increases and decreases respectively so as to progressively approach that of the orifice.

The passage 15 adjacent the feed screw 14 is of circular shape and gradually changes to a long narrow and horizontal opening adjacent the casing 17 and the bridge 22, so as to conform in shape with the elongated inlet opening of the passage 20. While the area of the circular inlet opening of the passage 15 is substantially the same as the elongated end of this passage, the width of the elongated opening is more than twice as long as the diameter of the circular inlet while the depth of the elongated opening is only about one third of this diameter. Thus, a large cylindrical mass of material may be transferred to a thinner elongated horizontal cross-section preparatory to further reduction of the area of the mass of material as the stock is conveyed to the passage 20 where it is further reduced in thickness until it issues through the discharge 26 in the form of the thin web W. The bridge 22 is of oblong shape and is provided with a sufficient number of openings 23 so that the total area of these openings will be about one third of the initial or inlet opening of the passage 15 adjacent the screw 14. Similarly, the inlet opening of the passage 20 which is a continuation of the elongated discharge opening of the passage 15, gradually increases in width and decreases in depth or thickness as it approaches the lip 25. As the film of stock passes through the lip 25, it is reduced to the desired thickness of the web W which may vary in accordance with the class or kind of material required. As the stock passes through the chamber 15, its flow is retarded due to the restriction of the openings 23 in the bridge 22. During the travel of the material through the passage 20, it is thinned down and brought to uniform temperature preparatory to its final extrusion through the orifice 26 in the lip 25.

In the operation of the apparatus any desired plastic material, such as a cellulose ester, is fed under heavy pressure by the screw conveyor 14 through the passage 15 and the apertures 23 in the obstruction 22 into and through the passage 20 and is extruded through the slot orifice 26 in the form of a continuous sheet or web W. The obstruction 22 tends to increase the resistance to the passage of the plastic material and, consequently, the pressure of the plastic material near the obstruction on the side thereof adjacent the extrusion press tends to build up and be considerably greater than the pressure of the plastic material between the obstruction and the orifice 26. This increase in pressure of the plastic material in this region causes the plastic material to be spread out under uniform pressure across the passage 20 and into and through the orifice 26 thus assuring uniformity in the thickness of the web W.

The source of pressure of the material for reasons which need not be explained fluctuates substantially. If this fluctuation in pressure produced corresponding fluctuation at the orifice, excessive variations in gauge would result. The bridge or obstruction 22 is a baffle or construction beyond which there is a sudden drop in pressure. The space 15 before the obstruction is reached forms a sort of pressure reservoir in the whole of which the pressure is more or less uniform, the fluctuations being somewhat distributed through a large mass of material. Beyond the obstruction 22, i. e. in the space 20, there is only a relatively small mass of material and the pressure is much lower, perhaps half that in the space 15, and accordingly the fluctuations in the space 20 are correspondingly diminished.

I claim:

1. In an apparatus for forming a web from plastic material, a casing providing a passage for the plastic material having an inlet opening of substantially circular shape and terminating in an elongated straight discharge orifice, means adjacent the inlet opening for feeding plastic material through said passage under high pressure, the diameter of said inlet opening being less than the width of said discharge orifice, and a perforated pressure-distributing baffle within said passage and remote from the inlet opening and feeding means so as to form a chamber between the end of the feeding means and the pressure distributing baffle, said baffle serving to increase the resistance to the flow of the material through the passage so as to cause the pressure of the material to be greater on the inlet side of the passage than on the outlet side thereof, the width of said passage gradually increasing and its depth gradually decreasing so as to approach that of said discharge orifice, said passage between the orifice and the inlet opening being unobstructed except by said perforated baffle and the passage at the orifice side of the baffle constituting an uninterrupted pressure reservoir whereby when the material issues from the perforated baffle any fluctuations in pressure are substantially reduced and the material is uniformly distributed across the passage and at the discharge orifice to form an elongated thin sheet of uniform thickness.

2. In an apparatus for forming a web from plastic material, means for feeding the plastic material under pressure, a casing providing a passage from the feeding means and terminating in a slot orifice, pressure-distributing means in said passage spaced substantially from said feeding means so as to form a chamber between the end of the feeding means and the pressure distributing means, the width and depth of said passage progressively approaching that of said orifice from said feeding means to said orifice, and said passage from said feeding means to the orifice being unobstructed except by said pressure-distributing means.

3. In an apparatus for forming a web from plastic material, a casing providing a passage for the plastic material terminating in a slot orifice, means for feeding plastic material through said passage under high pressure, and a perforated pressure-distributing baffle in said passage spaced substantially from said feeding means so as to form a chamber between the end of the feeding means and the pressure distributing means, the width of said passage progressively increasing and the depth decreasing so as to approach that of said orifice and said passage from said feeding means to the orifice being unobstructed except by said perforated baffle.

FREDERIC A. PARKHURST.